(12) United States Patent
Singh et al.

(10) Patent No.: US 9,313,714 B1
(45) Date of Patent: Apr. 12, 2016

(54) METHOD FOR PREFERRED ACCESS TO COMMUNICATION DEVICE ON A COMMUNICATION SYSTEM

(75) Inventors: Jasinder P. Singh, Olathe, KS (US); Jason Sigg, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 379 days.

(21) Appl. No.: 13/446,161

(22) Filed: Apr. 13, 2012

(51) Int. Cl.
*H04W 72/02* (2009.01)
*H04W 48/02* (2009.01)

(52) U.S. Cl.
CPC ..................................... *H04W 48/02* (2013.01)

(58) Field of Classification Search
CPC ..... H04W 48/16; H04W 48/18; H04W 4/021; H04W 64/00; H04W 88/06; H04W 48/02; H04W 72/005; H04W 24/04; H04W 8/18; H04W 8/24
See application file for complete search history.

(56) References Cited

U.S. PATENT DOCUMENTS

| | | | |
|---|---|---|---|
| 6,625,451 B1 | 9/2003 | La Medica, Jr. et al. | |
| 7,647,410 B2 * | 1/2010 | Claudatos et al. | 709/229 |
| 7,701,872 B2 | 4/2010 | Islam et al. | |
| 2004/0160918 A1 | 8/2004 | Narasimha | |
| 2005/0059397 A1 * | 3/2005 | Zhao | 455/435.2 |
| 2008/0194279 A1 * | 8/2008 | Choksi et al. | 455/518 |
| 2009/0264094 A1 * | 10/2009 | Smith | 455/404.2 |
| 2010/0167724 A1 * | 7/2010 | Haran et al. | 455/432.3 |
| 2010/0214996 A1 | 8/2010 | Santhanam et al. | |

* cited by examiner

*Primary Examiner* — Quan M Hua

(57) ABSTRACT

A method and a communication device for accessing a communication system are disclosed. The method includes determining that an application requesting access to the communication system requires preferred access to the communication system and requesting access to the communication system using a least preferred access channel from a preferred roaming list comprising a plurality of access channels. An access node of a communication system is further disclosed. The access node includes a processor to determine whether the communication system supports a preferred access to the communication system by at least one authorized communication device of the plurality of communication devices, and transmit an indication that the communication system supports the preferred access to the communication system by the at least one authorized communication device.

10 Claims, 10 Drawing Sheets

METHOD FOR PREFERRED ACCESS TO COMMUNICATION DEVICE ON A COMMUNICATION SYSTEM

TECHNICAL BACKGROUND

Wireless communication systems have become an important means by which many people worldwide have come to communicate. A wireless communication system may provide communication for a plurality of wireless devices, each of which may be serviced through one or more access nodes of the communication system.

A conventional wireless communication system may be configured to prioritize certain calls. However, in a contention-based access system, a prioritized call may still need to compete with non-prioritized or less-prioritized calls for access to the system.

Overview

A method to access a communication system is disclosed. The method includes determining, at a communication device, that an application requesting access to the communication system requires preferred access to the communication system, and requesting, by the communication device, access to the communication system using a least preferred access channel from a preferred roaming list comprising a plurality of access channels.

A method to access a communication system is disclosed. The method includes determining, at a communication device, whether a preferred access criteria for access to the communication system is satisfied, wherein the preferred access criteria includes determining that the communication system supports preferred access for the communication device, and requesting, by the communication device, access to the communication system using a least preferred access channel from a preferred roaming list comprising a plurality of access channels, when the preferred access criteria is satisfied. The preferred access criteria may further include the communication device being located within a predetermined geographical area and/or running an application particularly authorized for preferred access.

An access node of a communication system is disclosed. The access node includes a communication interface unit for communicating over at least one connection link with a plurality of communication devices, a storage unit, and a processor coupled to the communication interface and the storage unit configured to perform a method to control access to the communication system, the method including determining that the communication system supports a preferred access to the communication system by at least one authorized communication device of the plurality of communication devices, and transmitting an indication that the communication system supports the preferred access to the communication system by the at least one authorized communication device, wherein support for the preferred access to the communication system includes granting access to the at least one authorized communication device of the plurality of communication devices on a least preferred access channel from a preferred roaming list, and wherein the preferred roaming list comprises a plurality of access channels.

DETAILED DESCRIPTION

The foregoing general description, the following detailed description, and the accompanying drawings, are exemplary and explanatory only and are not restrictive of the present teachings, as claimed. The following detailed description and accompanying drawings set forth the best mode of the present teachings. For the purpose of teaching inventive principles, some aspects of the best mode may be simplified or omitted where they would be known to those of ordinary skill in the art.

The appended claims specify the scope of the present teachings. Some aspects of the best mode may not fall within the scope of the present teachings as specified by the claims. Thus, those skilled in the art will appreciate variations from the best mode that fall within the scope of the present teachings. Those skilled in the art will also appreciate that the features described below can be combined in various ways to form multiple variations of the present teachings. As a result, the present teachings are not limited to the specific examples described below, but only by the claims and their equivalents.

Figure 1:
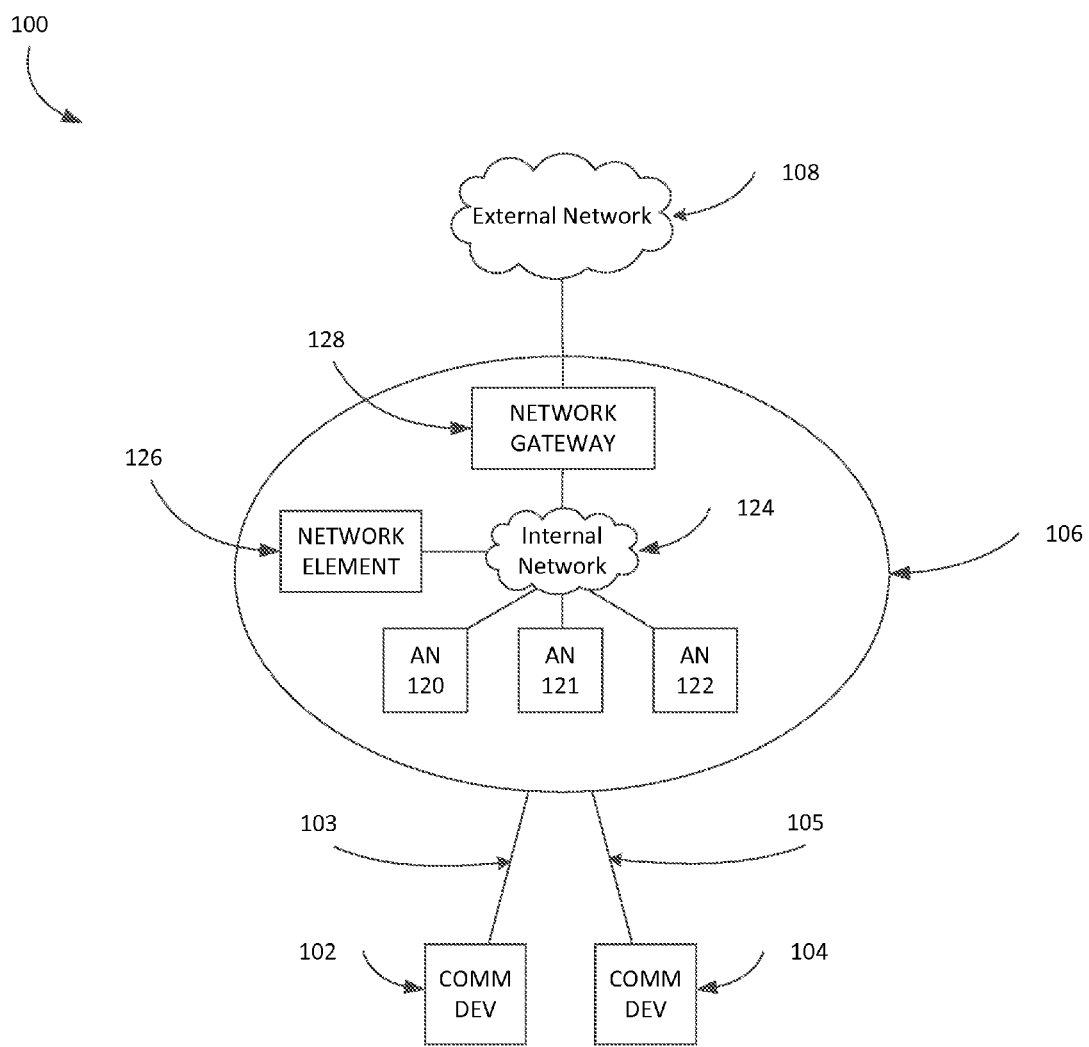
FIG. 1 includes a schematic diagram illustrating certain elements of an exemplary embodiment of the present teachings.

FIG. 1 illustrates communication environment 100 depicting certain aspects of the present teachings. Communication environment 100 comprises communication devices 102 and 104, communication system 106, and external network 108. Communication system 106 comprises access nodes 120-122, internal network 124, network element 126, and network gateway 128.

Communication system 106 provides wireless communication services to communication devices 102 and 104, and communication between communication system 106 and communication devices 102 and 104 may be implemented using one or more wireless communication protocols, such as integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format. Communication system 106 may provide half-duplex voice service, full-duplex voice service, and/or circuit switch/packet data service to communication devices 102 and 104.

Communication devices 102 and 104 may include any electronic device that may be used for voice and/or data communication over a wireless communication link. Examples of communication devices 102 and 104 include, but are not limited to, mobile/cellular phones, smart phones, personal digital assistants (PDAs), handheld devices, wireless modems, laptop computers, and personal computers.

Communication devices 102 and 104 may communicate with access node 106 over wireless links 103 and 105, respectively. Wireless links 103 and 105 may use the air or space as their transport media and may carry data as specified by one or more wireless communication protocols, such as iDEN, CDMA, EVDO, WiMAX, GSM, LTE, WIFI, HSPA, or some other wireless communication protocol. Communication devices 102 and 104 may be subscribers of communication system 106 or may be subscribers of another communication system (not shown) and capable of roaming into (and being served by) communication system 106.

An access node of access nodes 120-122 may include an access node radio and control equipment contained in a base station (BS), or cell site. However, an access node according to the present teachings is not so limited and may be configured differently. Although, for simplicity, communication system 106 is shown as including three access nodes (120-122), those of ordinary skill in the art will appreciate that communication system 106 may include more or less access nodes.

An access node of access nodes 120-122 may be used to provide a link between communication system 106 and communication devices 102 and 104, and may further provide connectivity between communication devices 102 and 104 and external network 108. The external network 108 may be the Internet, a wide area network (WAN), a local area network (LAN), an intranet, another carrier network, or some other type of communications network.

Connectivity between elements of communication system 106 is depicted for simplicity as internal network 124, but the present teachings are not so limited, and communication between elements of communication system 106 may include direct links, intermediate networks or systems, or other devices. Connectivity between the elements of communication system 106 may include links comprising metal, glass, air, space, or some other material as the transport media and communication therein may be realized through communication protocols such as Internet Protocol (IP), Ethernet, or some other communication format—including combinations thereof. Internal network 124 may comprise a router, a computer system, or any other element capable of interconnecting multiple devices.

Network element 126 may provide functionality to authenticate communication devices 102 and 104. Although Network element 126 is illustrated as a stand-alone element, its functionality may be integrated in one or more other elements of communication system 106.

Network gateway 128 may be any element which provides a gateway between the internal network 124 and an external network 108. Network gateway 128 may aggregate subscriber and control traffic from access nodes within a communication system, provide subscriber management functions, perform network optimization, and forward subscriber traffic as necessary.

Figure 2A:
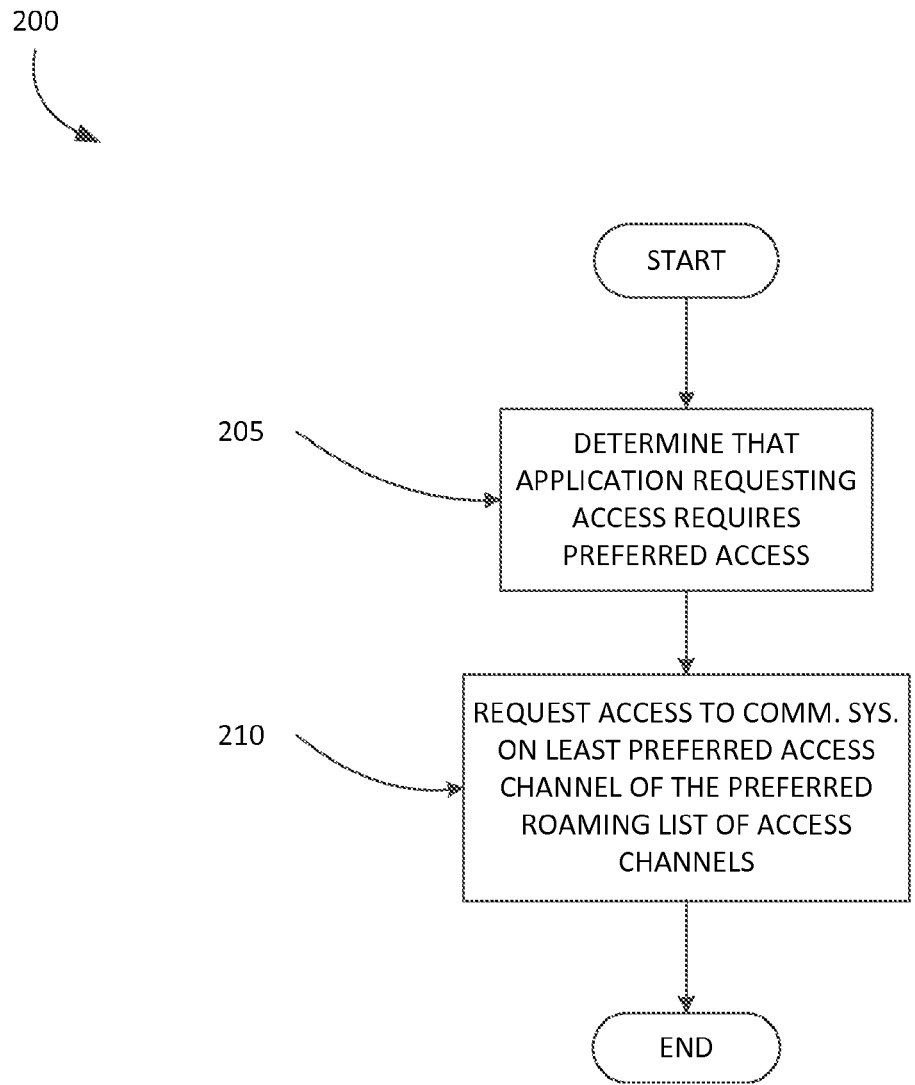
FIG. 2A includes a flowchart illustrating a process of an exemplary embodiment of the present teachings.

FIG. 2A illustrates a process 200 according to an exemplary embodiment of the present teachings for operating communication device 102. At step 205, communication device 102 determines that an application being executed therein, and requesting access to communication system 106, requires preferred access to communication system 106. The application may require preferred access due to, for example, a quality of service (QoS) setting, a carrier-negotiated service level, or because the application is delay-sensitive, such as may be the case for push-to-talk communication and/or public safety-related applications. At step 210, communication device requests access to communication system 106 on a least-preferred access channel of a preferred roaming list of access channels for communication system 106.

A preferred roaming list of access channels is a list which includes the access channels for a particular communication system in the order in which the communication system's operator determines communication devices should scan the access channels when seeking access to the communication system. The operator sets forth the most preferred access channel to access the communication system as the first entry into the list, followed by the second most-preferred access channel, and so on. Accordingly, the last entry into the list is the access channel the operator considers to be the least preferred access channel.

Conventionally, a communication device seeking access to a communication system scans a most-preferred access channel from the communication system's provided preferred roaming list. If the most-preferred access channel is available, the communication device requests access to the communication system through this channel. When the most-preferred access channel is unavailable, for example, because there is interference in that channel's frequency or the communication device has attempted access a predetermined number of times, the communication device retrieves form the preferred roaming list a next most-preferred access channel. The communication device will continue to scan channels in the order set forth in the preferred roaming list at least until an appropriate access channel is found and accessed. Accordingly, in a conventional communication system, the most-preferred access channels, as designated in the preferred roaming list, are the most likely channels to be selected for access by communication devices served by the communication system.

In systems where access is contention-based, however, many communication devices may request access at the same time on the most-preferred access channels. For example, a particular event, such as a sudden natural disaster, may cause an unusually high number of communication devices within, at least, the geographical area impacted by the event to request system access on their respective most-preferred channels. This may cause contention between the limited access resources within each channel, and thus, cause many devices to experience delay in accessing the system through the most-preferred channels of the preferred roaming list.

An embodiment allows one or more selected devices to request access to the system on least-preferred access channels, and thus, least-accessed access channels. In particular, as noted above, after determining that an application requesting access requires preferred access, communication device 102 requests access to communication system 106 on a least-preferred access channel of the preferred roaming list of access channels provided by communication system 106, which may receive less access requests from communication devices than the most-preferred access channels. Accordingly, communication device 102 may be less likely to face access delays due to competition for access with other communication devices served by communication system 106.

Figure 2B:
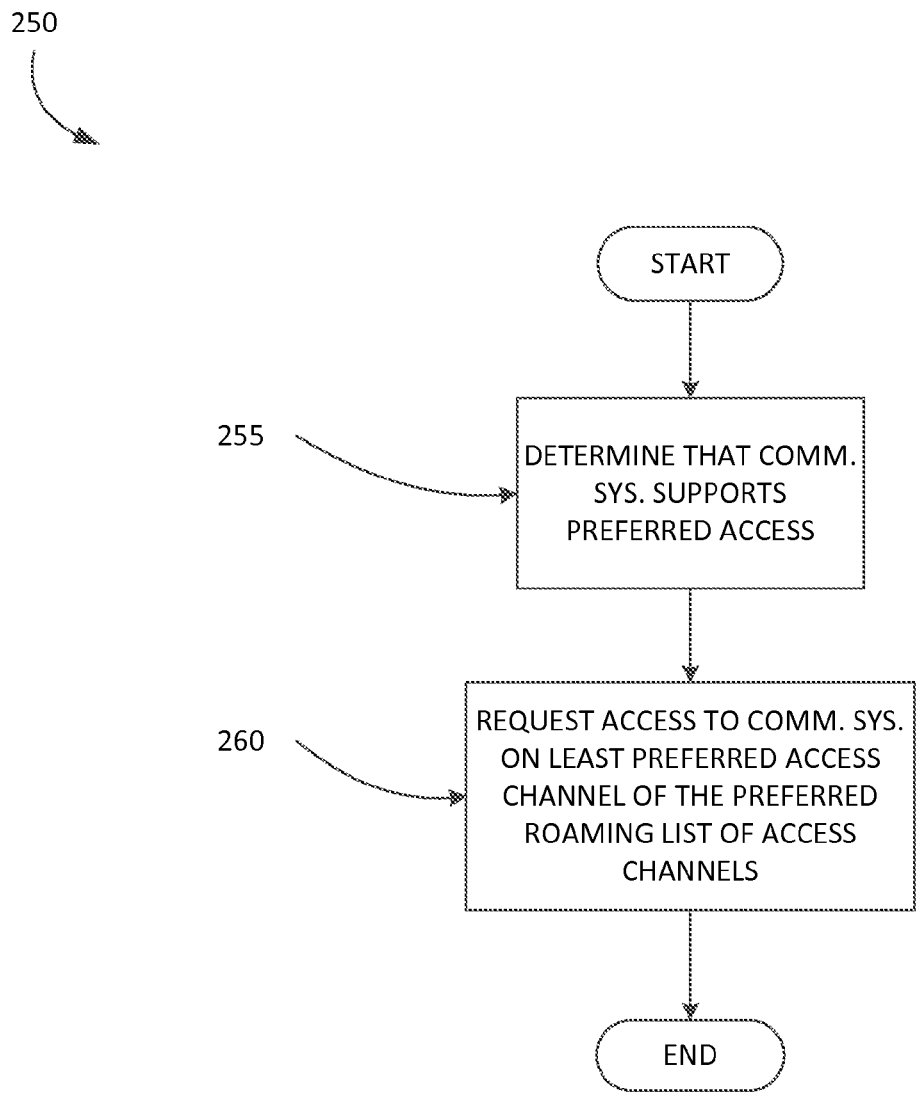
FIG. 2B includes a flowchart illustrating a process of another exemplary embodiment of the present teachings.

FIG. 2B illustrates a process 250 according to another exemplary embodiment of the present teachings for operating communication device 102. At step 255, communication device 102 determines that communication system 106 supports preferred access for communication device 102. At step 260, communication device requests access to communication system 106 on a least-preferred access channel of a preferred roaming list of access channels for communication system 106.

The present exemplary embodiment allow 2 one or more selected devices to request access to the system on least-preferred access channels, and thus, least-accessed access channels. In particular, as noted above, after determining that communication system 106 supports preferred access, communication device 102 requests access to communication system 106 on a least-preferred access channel of the preferred roaming list of access channels provided by communication system 106, which may receive less access requests from communication devices than the most-preferred access channels. Accordingly, communication device 102 may be less likely to face access delays due to competition for access with other communication devices served by communication system 106.

Figure 3:
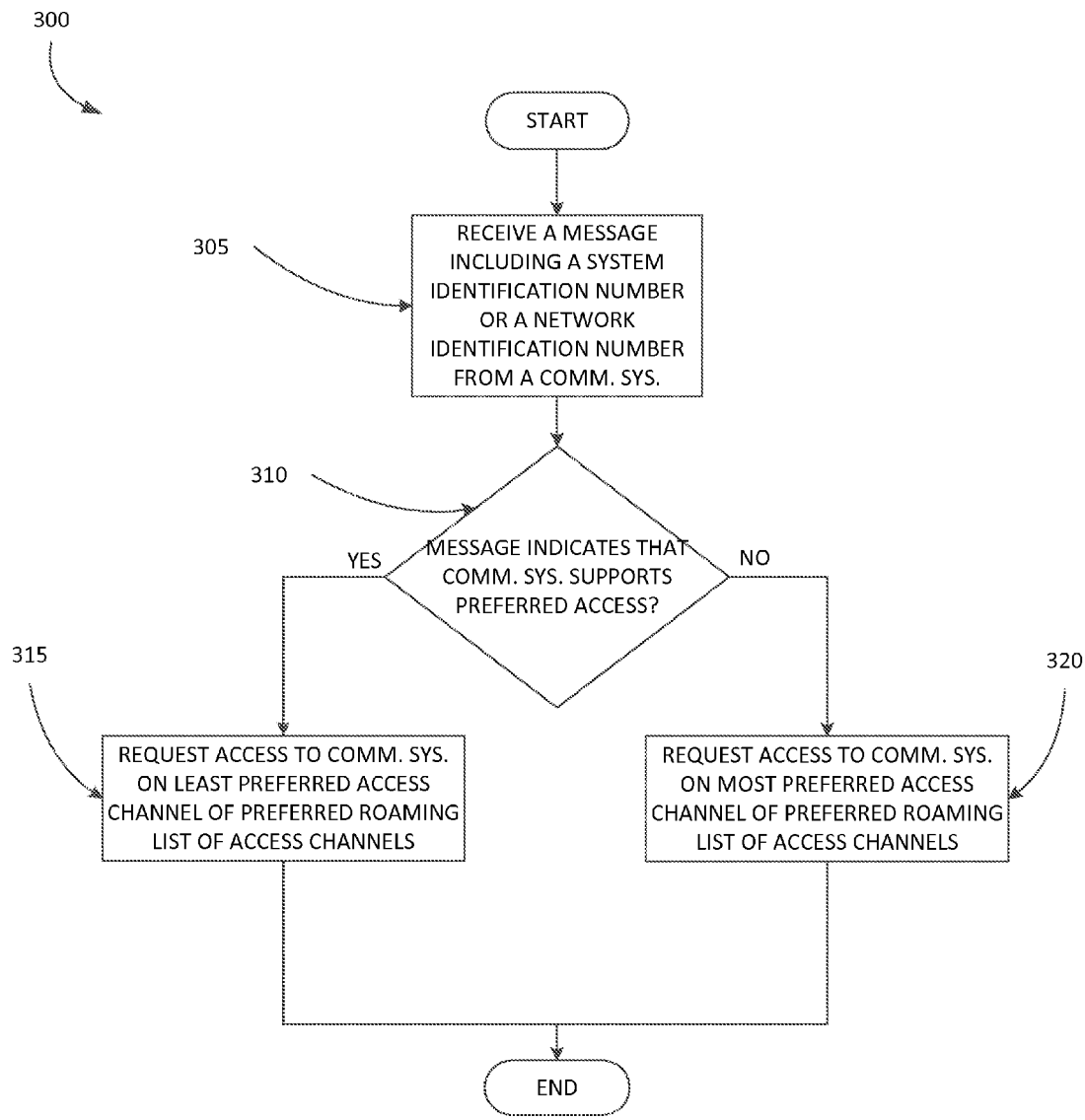
FIG. 3 includes a flowchart illustrating a process of yet another exemplary embodiment of the present teachings.

FIG. 3 illustrates a process 300 according to another exemplary embodiment of the present teachings for operating communication device 102. At step 305, communication device 102 receives a message including a system identification number or a network identification number from communication system 106. The message may include additional information indicating that communication system 106 supports preferred access for communication device 102, such as a flag within the message or a field of the message.

At step 310 communication device 102 determines whether the received message indicates that communication system 106 supports preferred access. Communication device 102 may determine that communication system 106 supports preferred access by comparing the system identification number and/or network identification number with a pre-determined list of system identification numbers and/or network identification numbers which support preferred access to the communication device. Communication device 102 may also, or in the alternative, determine that communication system 106 supports preferred access by virtue of a flag or field within the received message.

If communication device 102 determines that communication system 106 supports preferred access, communication device 102 requests access to communication system 106 on a least-preferred access channel of the preferred roaming list of access channels provided by communication system 106 (step 315). Accordingly, communication device 102 may be less likely to face access delays due to competition for access with other communication devices served by communication system 106. If, on the other hand, communication device 102 determines that communication system 106 does not support preferred access, communication device 102 requests access to communication system 106 on a most-preferred access channel of the preferred roaming list of access channels provided by communication system 106 (step 320).

Figure 4:
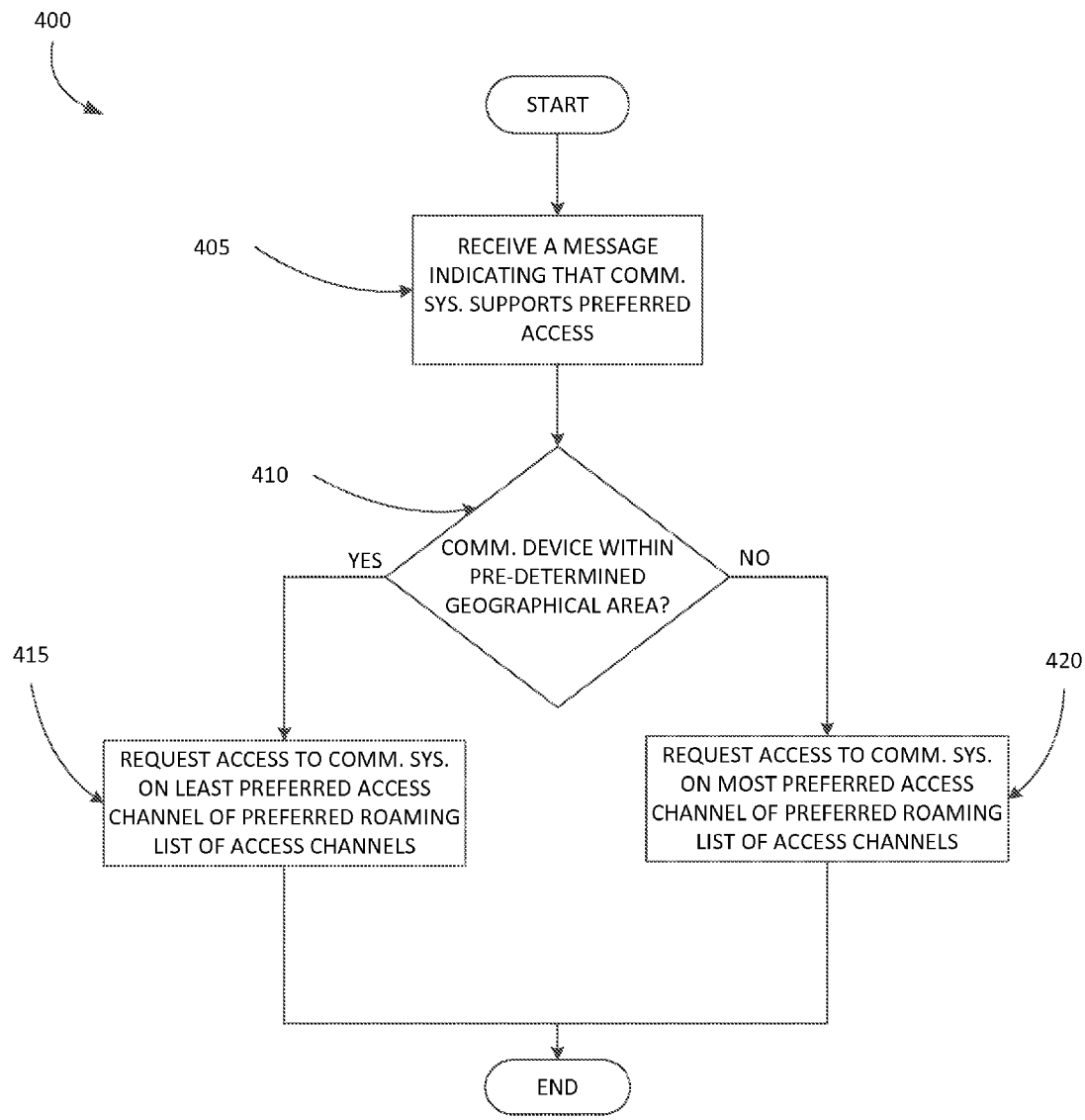
FIG. 4 includes a flowchart illustrating a process of yet another exemplary embodiment of the present teachings.

FIG. 4 illustrates a process 400 according to another exemplary embodiment of the present teachings for operating communication device 102. At step 405, communication device 102 receives a message from communication system 106 indicating that communication system 106 supports preferred access for communication device 102. At step 410 communication device 102 determines whether it is geographically located within a predetermined geographical area. Communication device 102 may determine its current location through known methods, such as an integrated global positioning system unit, a network-assisted positioning system unit, user input through a user interface, or any other means by which communication device 102 may determine accurate positioning information. Communication device 102 may be aware of the predetermined geographical area by downloading such information from communication system 106 or through any other means of receiving and storing area information.

If communication device 102 determines that it is located within the predetermined geographical area, communication device 102 requests access to communication system 106 on a least-preferred access channel of the preferred roaming list of access channels provided by communication system 106 (step 415). Accordingly, communication device 102 may be less likely to face access delays within the predetermined geographical area due to competition for access with other communication devices served by communication system 106, which may be advantageous when communication device 102 is located within a highly-populated area, or within an area experiencing an unexpectedly high volume of traffic. If, on the other hand, communication device 102 determines that communication system 106 is not located within the predetermined geographical area, communication device 102 requests access to communication system 106 on a most-preferred access channel of the preferred roaming list of access channels provided by communication system 106 (step 420).

Figure 5:
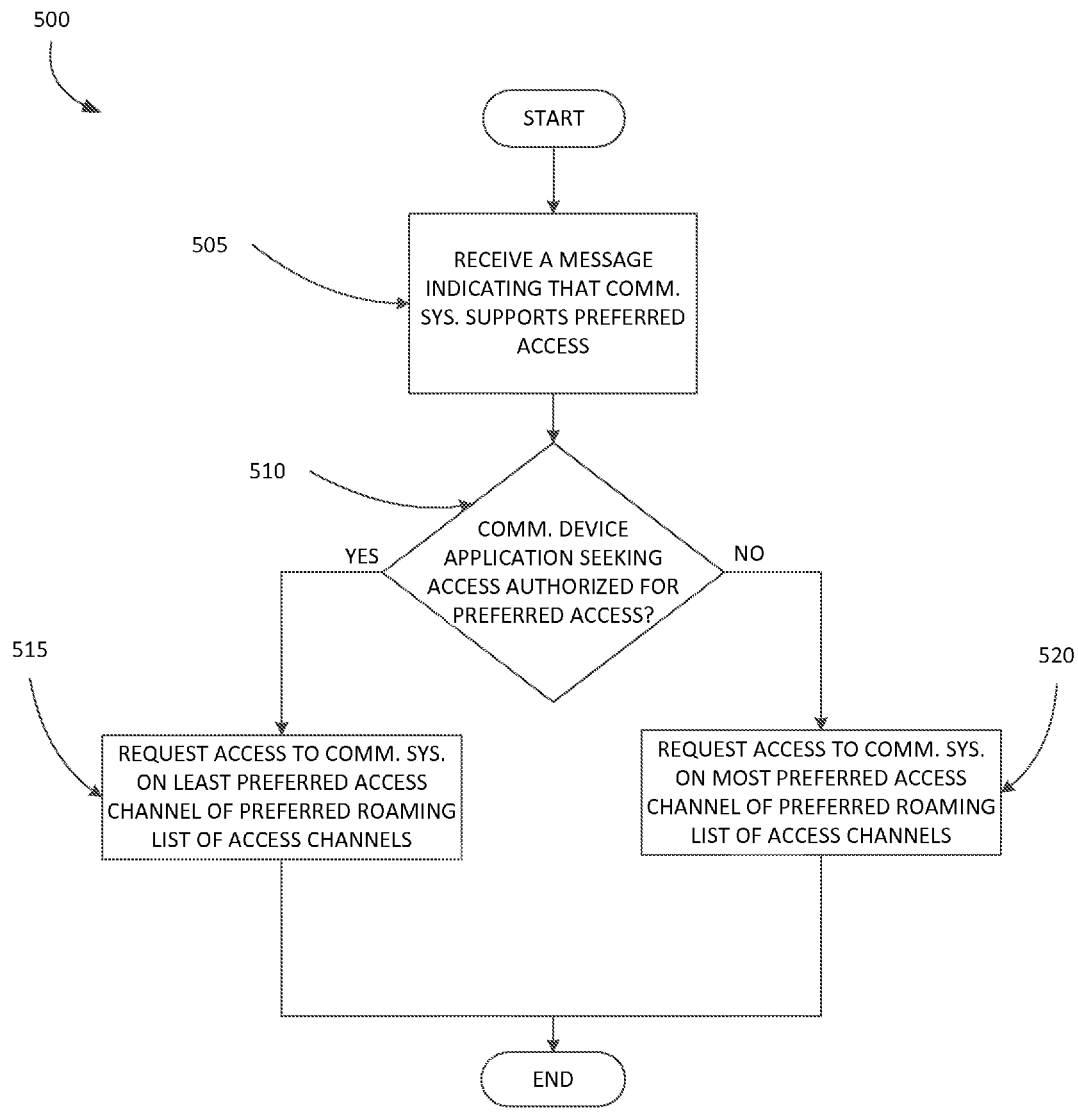
FIG. 5 includes a flowchart illustrating a process of yet another exemplary embodiment of the present teachings.

FIG. 5 illustrates a process 500 according to another exemplary embodiment of the present teachings for operating communication device 102. At step 505, communication device 102 receives a message from communication system 106 indicating that communication system 106 supports preferred access for communication device 102. At step 510 communication device 102 determines whether an application being executed therein, and requesting access to communication system 106, is authorized for preferred access. An application may be authorized for preferred access because, for example, it requires fast access to communication system 106. For example, and not as limitation, a high performance push-to-talk (PTT) application like PTT over Cellular (PoC) may require fast access to reduce the time between selecting to transmit voice (e.g., push a PTT button on the communication device) and the voice being transmitted to a target communication device. Authorization for preferred access may be provided by communication system 106 as a default configuration for some or all communication devices executing the application, by subscription with service associated with the application, as a feature associated with a particular payment plan or level of service, or any other means by which communication system 106 can associate communication device 102 with the authorized application.

If communication device 102 determines that the application seeking access is authorized for preferred access, communication device 102 requests access to communication system 106 on a least-preferred access channel of the preferred roaming list of access channels provided by communication system 106 (step 515). Accordingly, communication by communication device 102 through the authorized application may be less likely to face access delays, which may be beneficial when, for example, the application requires fast system access within a highly-populated area, or within an area experiencing an unexpected high volume of traffic. If, on the other hand, communication device 102 determines that the application seeking access is not authorized for preferred access, communication device 102 requests access to communication system 106 on a most-preferred access channel of the preferred roaming list of access channels provided by communication system 106 (step 520).

Figure 6:
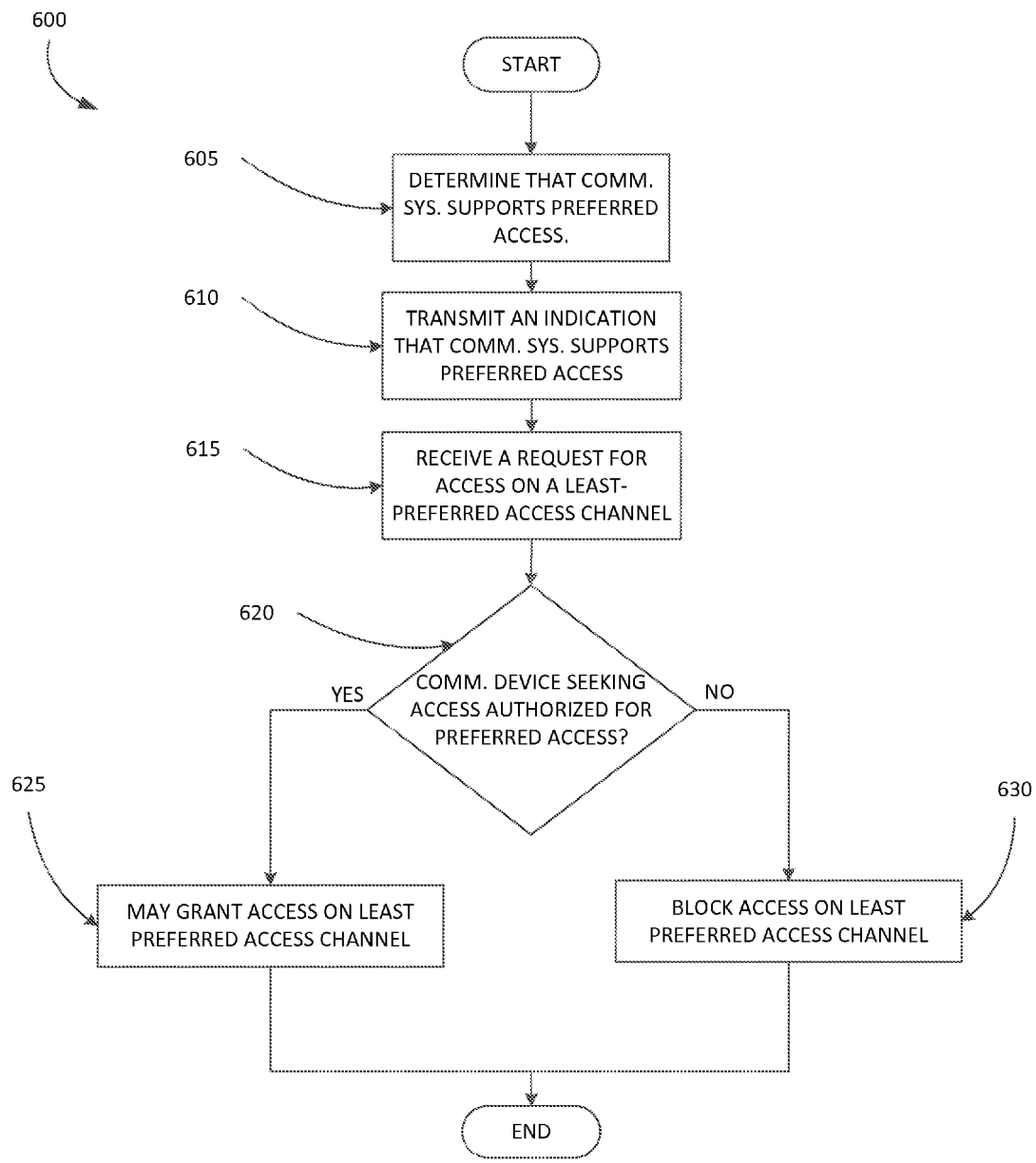
FIG. 6 includes a flowchart illustrating a process of yet another exemplary embodiment of the present teachings.

FIG. 6 illustrates a process 600 according to an exemplary embodiment of the present teachings for operating network element 126 of communication system 100 of FIG. 1. At step 605, the network node determines that communication system 106 supports preferred access to at least one communication device such as communication device 102. At step 610, network node 126 directs communication system 106 via access node 120, for example, to transmit an indication that communication system 106 supports preferred access to the system. The indication may include a flag or field in a message which all communication devices that may seek access into communication system 106 would listen to. Such message may include, for example, a system identification number and/or a network identification number.

At step 615, network node 126 receives a request for access from, for example, communication device 102, on a least-preferred access channel of the preferred roaming list corresponding to communication system 106. At step 620, network node 126 determines whether communication device 102 is authorized for preferred access. The determination may be based on, for example, a communication device 102-specific identification, on a particular application executed by communication device 102, on the current geographical location of communication device 102, on the current load of the system, etc. If communication device 102 is authorized to access the least preferred access channel, network element 126 may grant access on the least-preferred channel (step 625). If, on the other hand, communication device 102 is not authorized to access the least preferred access channel, network element 126 blocks access to communication device 102 on the least-preferred channel (step 630). Accordingly, the least-preferred channels are more likely to remain with significantly less congestion than the most-preferred channels and provide more reliable access to authorized communication devices.

Some or all of the above-described functionality may be performed by one or more elements of communication network 106. For example, and not as limitation, network element 126 may configure access node 120 perform some of the above-described functionality, or access node 120 may be configured to perform all of the above-described functionality.

Figure 7:
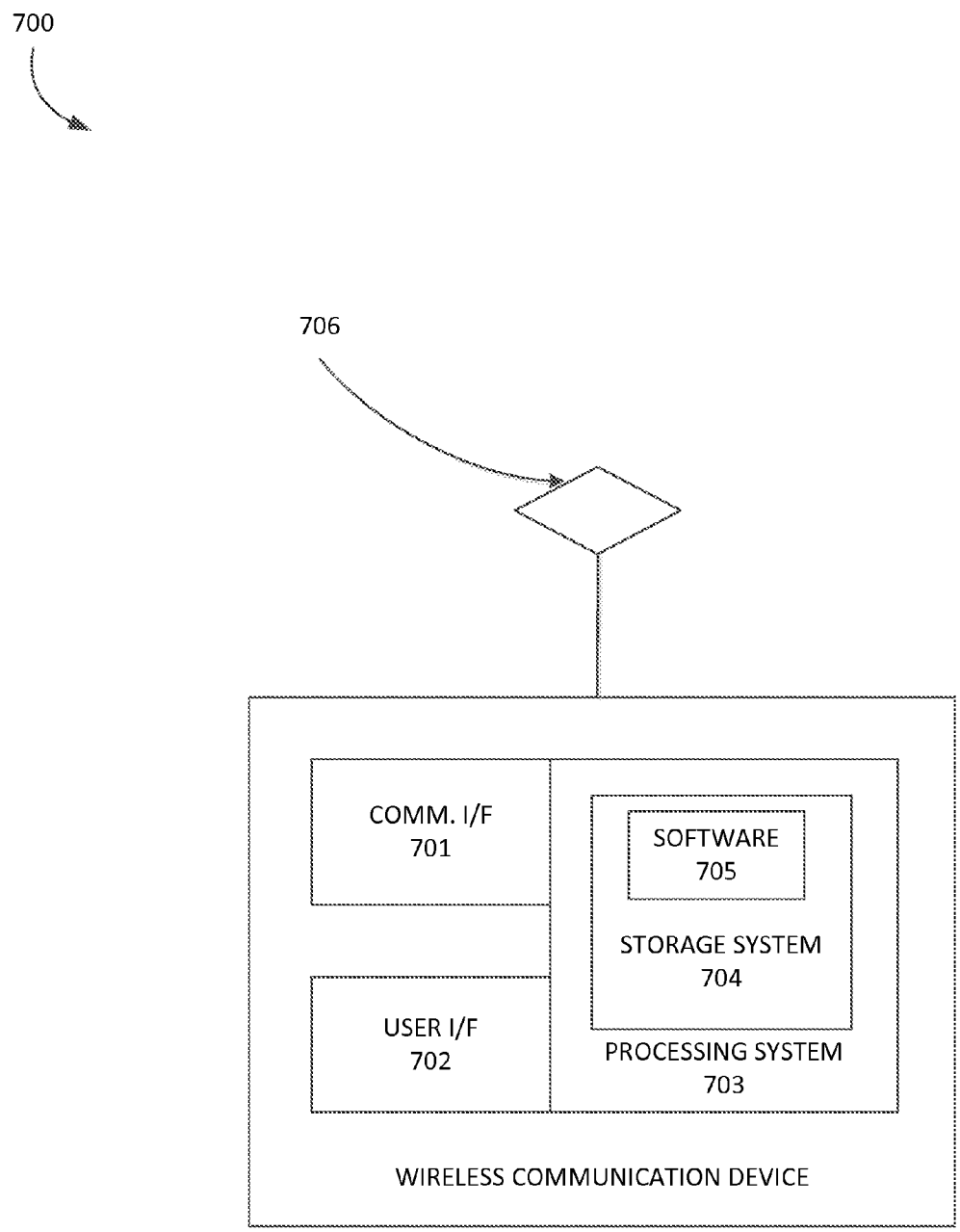
FIG. 7 includes a schematic diagram illustrating an exemplary communication device which includes certain aspects of the present teachings.

FIG. 7 illustrates wireless communication device 700. Wireless communication device 700 is an example of communication device 102 of FIG. 1, although a person of ordinary skill in the art would recognize that a wireless communication device according to the present teachings may be configured differently. Wireless communication device 700 comprises wireless communication interface 701, user interface 702, processing system 703, and radio antenna 706. Processing system 703 is linked to wireless communication interface 701 and user interface 702. Processing system 703 includes processing circuitry and storage system 704 that stores software 705. Wireless communication device 700 may include other well-known components such as a battery and enclosure that are not shown for clarity. Wireless communication device 700 may be a mobile phone, personal digital assistant (PDAs), computer, e-book reader, mobile Internet appliance, media player, game console, or some other wireless communication apparatus—including variations or combinations thereof.

Wireless communication interface 701 comprises at least RF communication circuitry to interface with radio antenna 706. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as WiMAX, CDMA, CDMA2000, WCDMA EVDO, GSM, LTE, WIFI, HSPA, or some other wireless communication format to communicate wirelessly with base stations.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing system 703 may comprise a microprocessor and other circuitry that retrieves and executes software 705 from storage system 704. Storage system 704 comprises a disk drive, flash drive, data storage circuitry, or some other memory apparatus. Processing system 703 is typically mounted on a circuit board that may also hold storage system 704 and portions of communication interface 701 and user interface 702. Software 705 comprises computer programs, firmware, or some other form of machine-readable processing instructions. Software 705 may include an operating system, utilities, drivers, network interfaces, applications, or some other type of software. When executed by processing system 703, software 705 directs processing system 703 to operate wireless communication device 700 as described herein for communication device 102.

Figure 8:
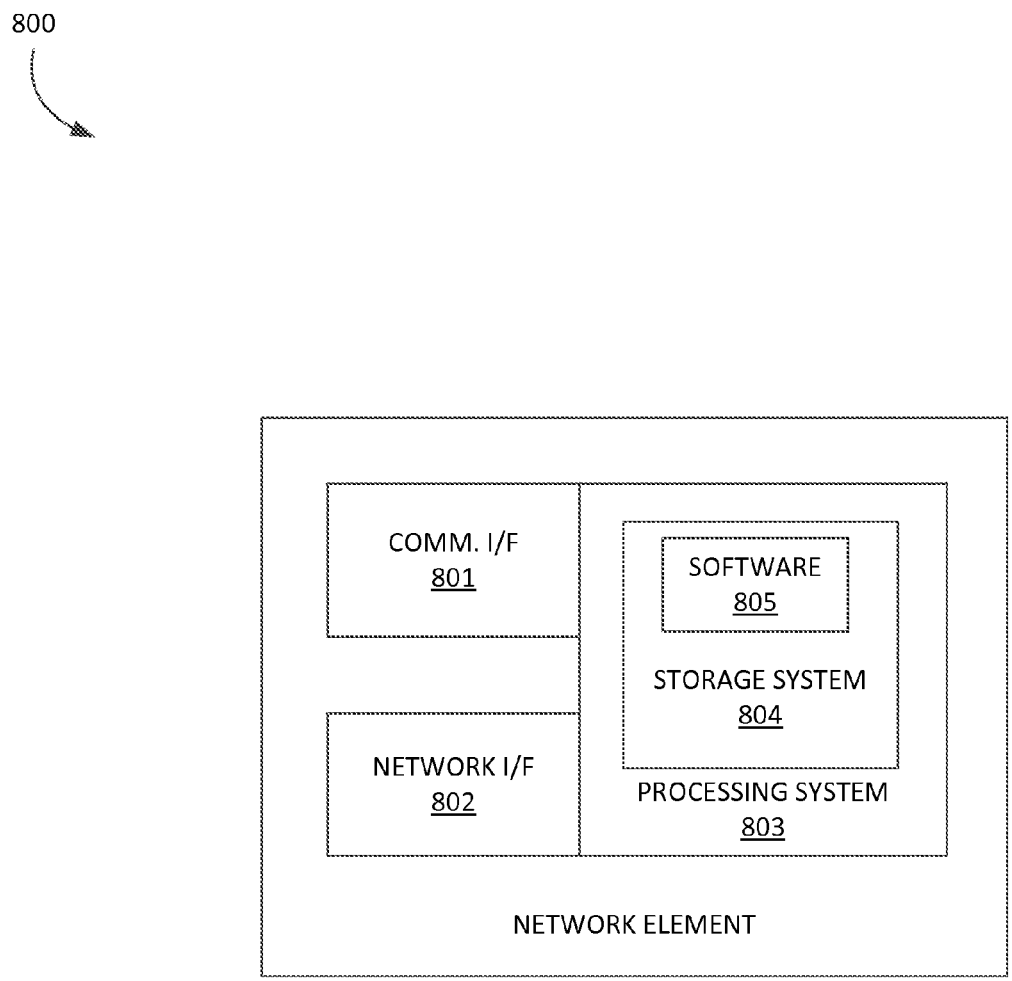
FIG. 8 includes a schematic diagram illustrating an exemplary network element which includes certain aspects of the present teachings.

FIG. 8 illustrates network element 800 according to the present teachings. Network element 800 is an example of network element 126 of FIG. 1, and thus, is comprised in a communication system such as communication system 106 described above with respect to FIG. 1. However, a person of ordinary skill in the art would recognize that a network element according to the present teachings may be configured differently.

Network element 800 includes a communication interface 801 to communicate with one or more elements of the communication system, such as access nodes 120-122 of FIG. 1. Network element 800 further includes network interface 802 to communicate with other networks, such as external network 108 through a network gateway, as illustrated in FIG. 1.

Network element 800 further includes processing system 803, which is linked to communication interface 801 and network interface 802. Processing system 803 includes processing circuitry for executing software 805 and storage system 804 to store software 805. Network element 800 may further include other well-known components such as a power management unit, a control interface unit, etc., which would be known to those of ordinary skill in the art, and are therefore, not shown for clarity.

Processing system 803 may include a microprocessor and other circuitry that retrieves and executes software 805 from storage system 804. Storage system 804 may include a disk drive, flash drive, data storage circuitry, or some other memory apparatus. Processing system 803 is typically mounted on a circuit board that may also hold storage system 804 and portions of communication interface 801 and network interface 802. Software 805 may include computer programs, firmware, or some other form of machine-readable processing instructions. Software 805 may also include an operating system, utilities, drivers, network interfaces, applications, or some other type of software. When executed by processing system 803, software 805 directs processing system 803 to operate network element 800 as described herein for network element 124.

Figure 9:
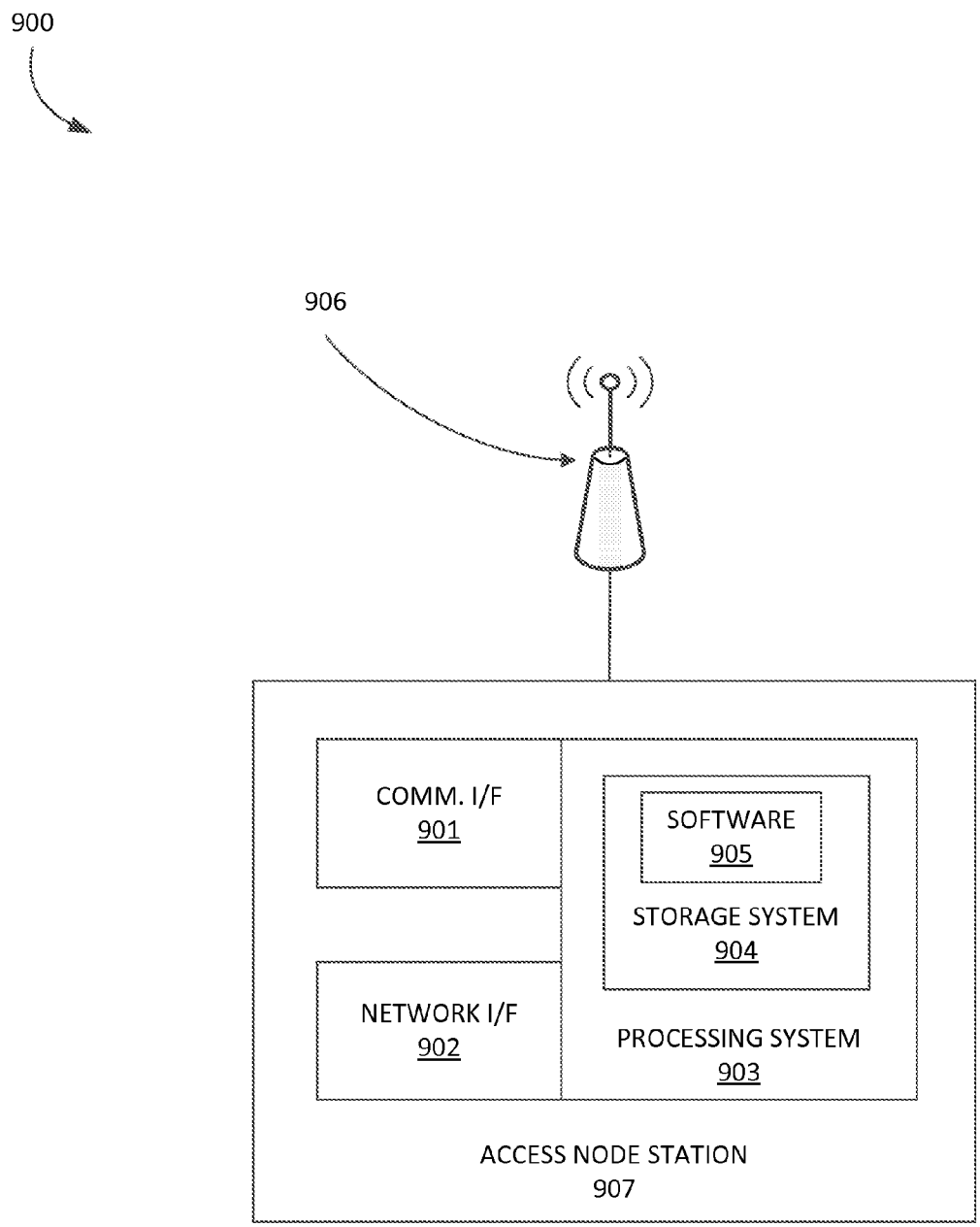
FIG. 9 includes a schematic diagram illustrating an exemplary access node which includes certain aspects of the present teachings.

FIG. 9 illustrates an access node 900 according to an exemplary embodiment of the present teachings. Access node 900 is an example of access nodes 120-122 of FIG. 1, and thus, is comprised in a communication system such as communication system 106 described above with respect to FIG. 1.

However, a person of ordinary skill in the art would recognize that a network element according to the present teachings may be configured differently. Access node 900 includes radio antenna 906 and access node station 907. Access node station 907 includes wireless communication interface 901, network interface 902, and processing system 903.

Processing system 903 is linked to wireless communication interface 901 and network interface 902. Processing system 903 includes processing circuitry for executing software 905 and storage system 904 to store software 905. Access node 900 may include other well-known components, such as a battery and enclosure, which would be known to those of ordinary skill in the art, and are therefore, not shown for clarity.

Wireless communication interface 901 includes at least RF communication circuitry to interface with radio antenna 906. The RF communication circuitry typically includes an amplifier, filter, RF modulator, and signal processing circuitry. Wireless communication interface 901 may also include a memory device, software, processing circuitry, or some other communication device. Wireless communication interface 901 may use various protocols, such as WiMAX, iDEN, CDMA, CDMA2000, WCDMA EVDO, GSM, LTE, WIFI, HSPA, or some other wireless communication format, to communicate wirelessly with, for example, communication devices 102 and 104.

Network interface 902 includes components that interact with a network, such as internal network 124, to communicate with other network elements such as an MSC, DAP, and other access nodes. Network interface 902 may allow the access node to communicate with the communications network via fiber optic cable, coax cable, or through a wireless link.

Processing system 903 may include a microprocessor and other circuitry that retrieves and executes software 905 from storage system 904. Storage system 904 includes a disk drive, flash drive, data storage circuitry, or some other memory apparatus. Processing system 904 is typically mounted on a circuit board that may also hold storage system 904 and portions of communication interface 901 and/or network interface 902. Software 905 includes computer programs, firmware, or some other form of machine-readable processing instructions. Software 905 may include an operating system, utilities, drivers, network interfaces, applications, or some other type of software. When executed by processing system 903, software 905 directs processing system 903 to operate access node 900 as described herein for access nodes 120-122.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures explain the best mode of the present teachings. Other embodiments will be apparent to those skilled in the art from consideration of the specification and practice of the teachings disclosed herein. It is intended that the specification and examples be considered as exemplary only, with a true scope and spirit present teachings being indicated by the following claims.

What is claimed is:

1. A method to access a communication system, the method comprising:
   determining, at a communication device, whether an application requesting access to the communication system requires preferred access to the communication system and whether the application is authorized for preferred access to the communication system;
   requesting, by the communication device, access to the communication system using a least preferred access channel from a preferred roaming list comprising a plurality of access channels when it is determined that the application requires preferred access; and
   requesting, by the communication device, access to the communication system using a most preferred access channel from the preferred roaming list when it is determined that the application lacks authorization for preferred access.

2. The method of claim 1, further comprising
   determining that the communication device is located within a pre-determined geographical area; and
   requesting, by the communication device, access to the communication system using the least preferred access channel based on the determined location.

3. The method of claim 1, wherein determining that an application requesting access to the communication system requires preferred access to the communication system comprises determining that the application is delay-sensitive.

4. A method to access a communication system comprising: determining, at a communication device, whether a preferred access criteria for access to the communication system is satisfied, wherein the preferred access criteria comprises determining that the communication system supports preferred access for the communication device; and
   requesting, by the communication device, access to the communication system using a least preferred access channel from a preferred roaming list comprising a plurality of access channels, when the preferred access criteria is satisfied; and
   requesting, by the communication device, access to the communication system using a most preferred access channel from the preferred roaming list, when the preferred access criteria is not satisfied.

5. The method of claim 4, wherein the determining that the communication system supports preferred access for the communication device comprises receiving an indicator from the communication system indicating that the communication system supports preferred access.

6. The method of claim 5, wherein the indicator is included in a message comprising at least one of a system identification number and a network identification message.

7. The method of claim 4, wherein the determining that the communication system supports preferred access for the communication device comprises:
   receiving, from the communication system, a message comprising at least one of a system identification number and a network identification number; and
   retrieving, from a storage unit coupled to the communication device, a list including at least one communication system that supports preferred access and at least one system identification number and network identification number of each of the at least one communication system that supports preferred access, determining that the communication system is one of the at least one communication system that supports preferred access based on the at least one of a system identification number and a network identification number in the received message and the list.

8. The method of claim 4, wherein the preferred access criteria further comprises determining that the communication device is located within a pre-determined geographical area.

9. The method of claim 4, wherein the preferred access criteria further comprises determining that an application requesting access to the communication system is an application authorized for preferred access.

10. The method of claim 4, wherein determining that an application requesting access to the communication system requires preferred access to the communication system comprises determining that the application is delay-sensitive.

* * * * *